United States Patent
Petri

(10) Patent No.: US 8,010,518 B2
(45) Date of Patent: Aug. 30, 2011

(54) METHOD FOR MULTICONTEXT XML FRAGMENT REUSE AND VALIDATION IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 11/675,239

(22) Filed: Feb. 15, 2007

(65) Prior Publication Data

US 2008/0201365 A1 Aug. 21, 2008

(51) Int. Cl.
*G06F 7/00* (2006.01)
(52) U.S. Cl. .................................................. 707/705
(58) Field of Classification Search .................. 707/103, 707/705
See application file for complete search history.

(56) References Cited

U.S. PATENT DOCUMENTS

| | | | |
|---|---|---|---|
| 7,487,515 B1* | 2/2009 | Jones et al. | 719/328 |
| 2003/0142128 A1* | 7/2003 | Reulein et al. | 345/742 |
| 2005/0091581 A1* | 4/2005 | Bezrukov et al. | 715/513 |
| 2006/0155725 A1* | 7/2006 | Foster et al. | 707/100 |
| 2007/0239749 A1* | 10/2007 | Farahbod | 707/101 |

* cited by examiner

*Primary Examiner* — Tony Mahmoudi
*Assistant Examiner* — Jensen Hu
(74) *Attorney, Agent, or Firm* — Patterson & Sheridan LLP

(57) ABSTRACT

Method, article and apparatus for the reusability of data objects such as XML document fragments managed by a content management system (CMS). Embodiments of the invention may be used to enforce validation requirements for a multi-context XML fragment (i.e., for a fragment referenced in two or more documents managed by the CMS). When changes are made to a multi-context fragment, the CMS may detect any validation problems and take corrective action to resolve the validation problem.

12 Claims, 9 Drawing Sheets

METHOD FOR MULTICONTEXT XML FRAGMENT REUSE AND VALIDATION IN A CONTENT MANAGEMENT SYSTEM

BACKGROUND OF THE INVENTION

1. Field of the Invention

Embodiments of the invention are generally related to managing a collection of data objects in a content management system. More specifically, embodiments of the invention are related to a method and system for managing XML fragments used in multiple contexts to ensure fragment validity within multiple XML documents.

2. Description of the Related Art

Content management systems (CMS) allow multiple users to share information. Generally, a CMS allows users to create, modify, archive, search, and remove data objects from an organized repository. The data objects managed by a CMS may include documents, spreadsheets, database records, digital images, and digital video sequences, to name but a few. A CMS typically includes tools for document publishing, format management, revision and/or access control, along with tools for document indexing, searching, and retrieval.

An XML-aware CMS may provide the users with a variety of advantages, for example:
  structured authoring—the ability to incorporate metadata that is normally lost in conventional formats
  repurposing of data—the ability to share fragments of data or to transform the data into different formats
  publishing—the ability to have "single source publishing" using XML stylesheets (e.g. XSLT) that separate content from presentation
  interoperability—the ability to utilize XML data across different systems or applications
  intelligent storage—the ability to synchronize XML content with attributes in the CMS Because of these, and other advantages, XML is growing in popularity as the preferred format for authoring and publishing (e.g. for Web page authoring/publishing).

To provide some of these advantages, a CMS may be configured to break apart or disassemble an XML document into smaller chunks, a process called bursting, where each chunk can be managed as its own object in the CMS. The XML document may be referred to as a parent document and the chunks may be referred to as fragments. When the user edits an XML document that has been burst, an XML application or the CMS assembles the various fragments "automatically" so that the XML document appears to be a single unit. In addition to bursting, there are numerous other techniques, equally known in the art, for the creation of XML fragments.

Fragments are often independent documents in the CMS, separate from a parent document. By storing commonly used XML fragment data as a CMS document, the common information may be written once and simply linked to by one or more documents. In addition, if the fragment relates to its parent document by a "floating" link relationship, the CMS ensures that any changes to the latest version of that fragment data are automatically visible within the context of the parent. For example, a company's copyright statement may be stored in an XML fragment included with a parent document. If the copyright statement is to be changed, only the XML fragment copyright statement needs to be updated and not the parent XML document. The benefits of such a scheme become more evident when an XML fragment is included within several parent documents, as a company's copyright statement is likely to be. Thus, in the present example, when a user updates the XML fragment copyright statement, any documents that reference the fragment will incorporate the update automatically.

Since fragments are often stored in the CMS independent of parent documents, information stored in the fragment may be difficult or impossible to validate because the information exists out of context. Compounding this problem is the fact that a single XML fragment could be included within various parent XML documents or even other fragments, each of which may use a different XML grammar. As a result, there may be numerous contexts in which a single fragment must remain valid. Thus, there exists a potential for a fragment to be modified in one context such that it cannot be validated in another context, possibly leading to a parent XML document which cannot be properly loaded by the CMS.

For example, assume that a particular XML fragment F was originally created for parent document A and contains only text (i.e., it contains no child elements). Assume further that parent document A is governed by schema 1 which states that F may contain both text and children. Further, assume that the author of parent document B includes fragment F within document B. However, parent document B is governed by schema 2 which states that fragment F may contain only text and no children. As long as fragment F contains no children it may remain valid within the context of both document A and document B. However, if the author of document A later added a child element to fragment F, document B will no longer validate against its governing schema (i.e., schema 2).

In current art this problem is solved proactively by either restricting what XML fragments may be inserted into a document to certain object types (e.g. object types guaranteed to remain valid in their parent context), or restricting content of XML fragments to text (e.g. no child elements). Additionally, to prevent conflicts, authors are generally limited to shared content created within the same context (e.g. document type, a particular grammar, etc.) as the author's document. For example, using this approach, an XML fragment which was originally created according to a "design" grammar may not be incorporated into a document composed using a "book" grammar even if the fragment is valid in both contexts. This scenario may greatly limit an author's choices of shared content to include in an XML document. Further, this limitation naturally leads to duplicative efforts when an author creates a fragment identical to an existing fragment which is unavailable for use because it was created within a different context.

Accordingly, for all the foregoing reasons, there remains a need in the art of CMS document management system which permits greater fragment reuse by lessening/removing restrictions on fragment content and which ensures that an XML fragment data remains valid when used in multiple, possibly dissimilar contexts.

SUMMARY OF THE INVENTION

Embodiments of the invention generally enable improved reuse of XML fragments in a content management system (CMS).

Embodiments of the invention include a method of managing data objects in a content management system (CMS). The method generally includes accessing a first data object managed by the CMS, where the first data object includes a collection of one or more data object fragments, where a first fragment of the one or more data object fragments is referenced by a second data object stored in the CMS, and where the first data object and the second data object are composed according to respective schemas. The method also includes receiving a modified version of the first data object to store in the CMS where the modified version of the first data object includes a modified version of the first fragment. The method also includes fragmenting the modified version first data object into the one or more data object fragments and validating the modified version of the first fragment against the schema associated with the second data object; and includes, upon determining that the modified version of the first fragment fails to validate against the schema associated with the second data object, performing a corrective action specified by the CMS.

In a particular embodiment, the corrective action may include associating the modified version of the first fragment with the first data object, generating an unmodified version of the first fragment, and associating the unmodified version of the first fragment with the second data object.

Alternatively, the corrective action may include incorporating the content from the modified version of the first fragment into the first data object, generating an unmodified version of the first fragment, associating the unmodified version of the first fragment with the second data object, and discarding the modified version of the first fragment.

Still alternatively, the corrective action may include generating an unmodified version of the first fragment, incorporating the content from the unmodified version of the first fragment into the second data object, associating the modified version of the first fragment with the first data object, and discarding the unmodified version of the first fragment.

Another embodiment of the invention includes a computer-readable storage medium containing a program which, when executed, performs an operation for managing data objects in a content management system (CMS). The operation generally includes accessing a first data object managed by the CMS, where the first data object includes a collection of one or more data object fragments, where a first fragment of the one or more data object fragments is referenced by a second data object stored in the CMS, and where the first data object and the second data object are composed according to respective schemas. The operation also includes receiving a modified version of the first data object to store in the CMS, where the modified version of the first data object includes a modified version of the first fragment. The method also includes fragmenting the modified version first data object into the one or more data object fragments, validating the modified version of the first fragment against the schema associated with the second data object, and upon determining that the modified version of the first fragment fails to validate against the schema associated with the second data object, performing a corrective action specified by the CMS.

Embodiments of the invention also include a system having a processor and a memory containing a content management system (CMS) program which, when executed by the processor, performs an operation for managing data objects in the CMS. The operation generally includes accessing a first data object managed by the CMS, where the first data object includes a collection of one or more data object fragments, where a first fragment of the one or more data object fragments is referenced by a second data object stored in the CMS, and where the first data object and the second data object are composed according to respective schemas. The operation also includes receiving a modified version of the first data object to store in the CMS wherein the modified version of the first data object includes a modified version of the first fragment, fragmenting the modified version first data object into the one or more data object fragments, and includes validating the modified version of the first fragment against the schema associated with the second data object. Upon determining that the modified version of the first fragment fails to validate against the schema associated with the second data object, the operations include performing a corrective action specified by the CMS.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
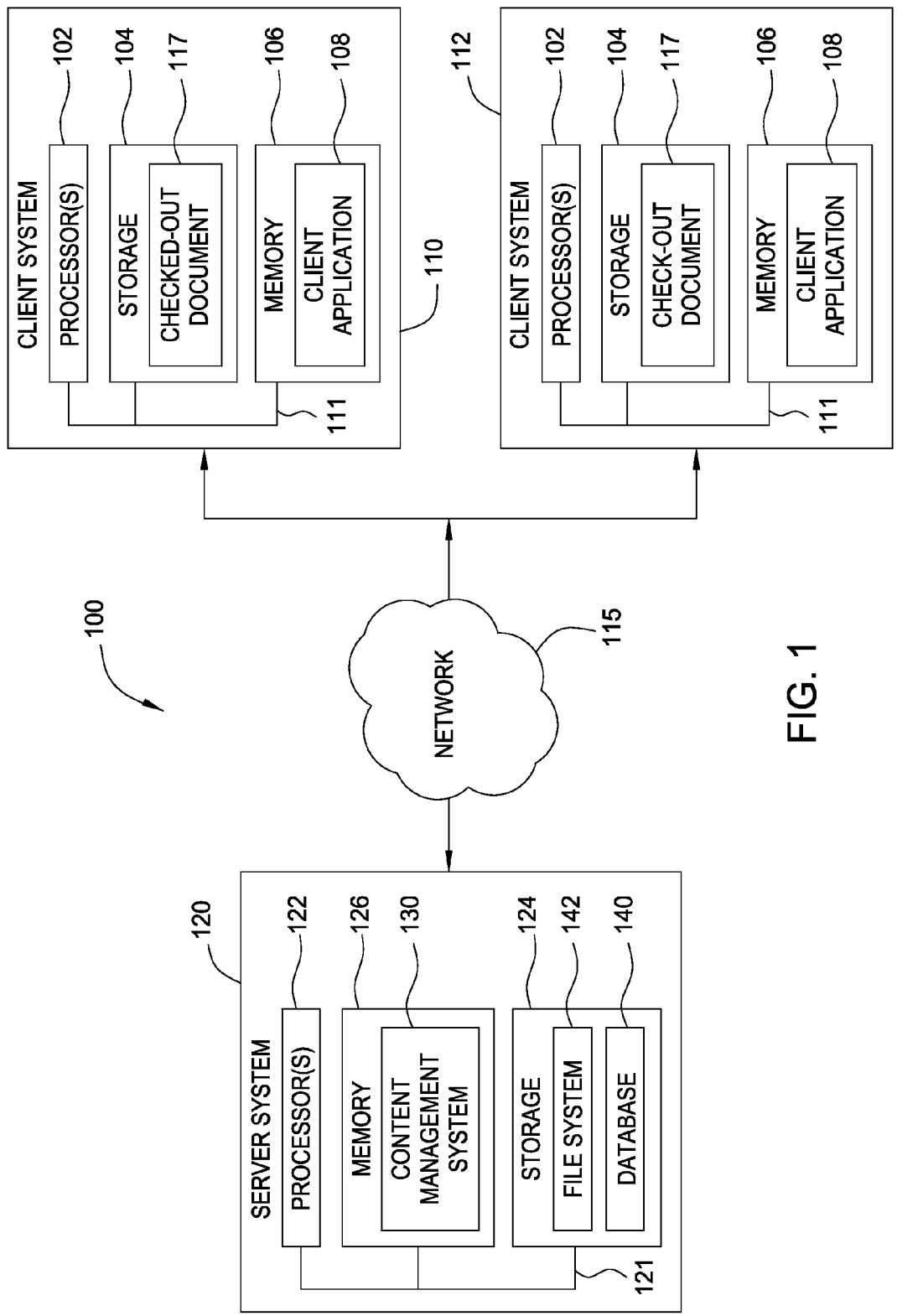
FIG. 1 is a block diagram illustrating a computing environment and content management system (CMS), according to one embodiment of the invention.

Embodiments of the invention generally enable improved reuse of XML fragments in a content management system (CMS). Further, embodiments of the invention enforce validation requirements for multi-context XML fragments that cannot be validated as stand-alone documents in the CMS. When changes are made to a multi-context fragment (i.e. fragments that have multiple dissimilar parent contexts, grammars or schemas), the CMS may detect any validation problems and then correct those problems based on configuration settings specifying a corrective action to be taken.

As described above, data in a CMS (e.g. an XML fragment) is shared between several documents in the CMS (e.g. multiple XML documents, governed by different schemas, grammars, etc.) For example, assume that two different XML schemas both allow documents having a <paragraph> element, in such a case, an XML fragment consisting of an instance of a <paragraph> element (i.e., a paragraph of text, bracketed by <paragraph> tags) may be referenced by documents of either schema. As used herein, such a fragment may be referred to as a "multi-context" fragment. A potential problem arises when the content of such a <paragraph> fragment is modified within the context of one document (or schema) such that it is no longer valid within the context of another document (or schema). By including a data validation tool within the CMS which analyzes modified data for potential conflicts and resolves such conflicts may circumvent this problem. Furthermore, such a tool may be used during the document authoring process to determine a collection of available content from all data stored by the CMS to data which will be valid within the context of a particular document.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Further, embodiments of the invention are described herein adapted for use with the widely used XML markup language. Accordingly, references to data objects, documents, and XML documents generally refers to data marked up using a well-formed collection of XML tags, elements and/or attributes. As is known, an XML document may be used to describe virtually any type of data. For example, XML grammars have been used to describe word processing documents, spreadsheets, database records, digital images and digital video, to name but a few. Further, specialized grammars are frequently specified by a domain specific XML schema (e.g., the eCTD specification). A given XML document may also be associated with additional artifacts such as a document type definition (DTD), XSLT transforms XSL style sheets, and other associated files, tools and utilities. However, the invention is not limited to the XML markup language, XML schemas, and the use of XML documents; rather, embodiments of the invention may be adapted to other markup languages or other data object formats or data representations, whether now known or later developed.

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Content Management System

FIG. 1 is a block diagram that illustrates a client/server view of a computing environment 100, according to one embodiment of the invention. As shown, computing environment 100 includes two client computer systems 110 and 112 communicating with a server system 120 over a network 115. The computer systems 110, 112, and 120 illustrated in environment 100 are included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Additionally, those skilled in the art will recognize that the illustration of computer systems 110, 112, and 120 are simplified to highlight aspects of the present invention and that computing systems and networks typically include a variety of additional elements not shown in FIG. 1.

As shown, client computer systems 110 and 112 each include a CPU 102, storage 104, and memory 106 connected by a bus 111. CPU 102 is a programmable logic device that performs all the instructions, logic, and mathematical processing performed in executing user applications (e.g., a client application 108). Storage 104 stores application programs and data for use by client computer systems 110 and 112. Typical storage devices 104 include hard-disk drives, flash memory devices, optical media and the like. Additionally, the processing activity and access to hardware resources made by client application 108 may be coordinated by an operating system (not shown). Well known examples of operating systems include the Windows® operating system, distributions of the Linux® operating system, and IBM's OS/2® operating system, among others. (Linux is a trademark of Linus Torvalds in the US, other countries, or both). Network 115 represents any kind of data communications network, including both wired and wireless networks. Accordingly, network 115 is representative of both local and wide area networks, including the Internet.

Illustratively, memory 106 of client computer systems 110 and 112 includes a client application 108. In one embodiment, client application 108 is a software application that allows users to access documents stored by a content management system (CMS) 130. Thus, client application 108 may be configured to allow users to create, edit, and save documents, e.g., word-processing documents, spreadsheets, database records, digital images or video data objects, to name but a few (collectively referred to as "documents") from CMS 130. In one embodiment, client application 108 may be configured to receive a document 117 from CMS 130 and store it in storage 104 while it is being accessed by client application 108.

Documents accessed from CMS 130 may be marked up with XML tags describing the substantive data within the document, relative to an associated XML schema. When a new document is created (e.g., a new parent XML document) CMS 130 may prompt the user to specify attributes for the document. The CMS 130 may then use the attributes in conjunction with a validation process to filter a collection of potential XML fragments for use in the parent document. This may ensure that a user has a wide variety of valid fragments to choose from when authoring an XML document.

The CMS 130 may be further configured to provide lifecycle management for a given XML fragment. For example, versions of fragments referenced by a parent document may change over time, and the parent document may be configured to always refer to the current version of a given fragment (e.g., the most current version of an XML element, style sheet, DTD or schema). Alternatively, the parent document may be configured to always refer to a specific version of a given fragment. This may be useful when different available versions of a fragment referenced by parent documents are incompatible with one another.

Server system 120 also includes a CPU 122, CMS storage repository 124, and a memory 126 connected by a bus 121. CMS repository 124 may include a database 140 and file system 142. File system 142 typically provides access to a directory structure contained on a disk drive or network file system and may be used to store files (e.g., documents, XML fragments, and configuration sets managed by CMS 130). Database 140 may contain additional information and metadata related to documents stored in file system 142. Memory 126 of server system 120 includes CMS 130. CMS 130 provides an application program configured for creating, modifying, archiving, and removing content managed by CMS 130. Thus, CMS 130 may include tools used for publishing, format management, revision and/or access control, content indexing, and facilities for performing searches and other operations related to documents managed by CMS 130.

Document Check-In and Validation Tool

Figure 2:
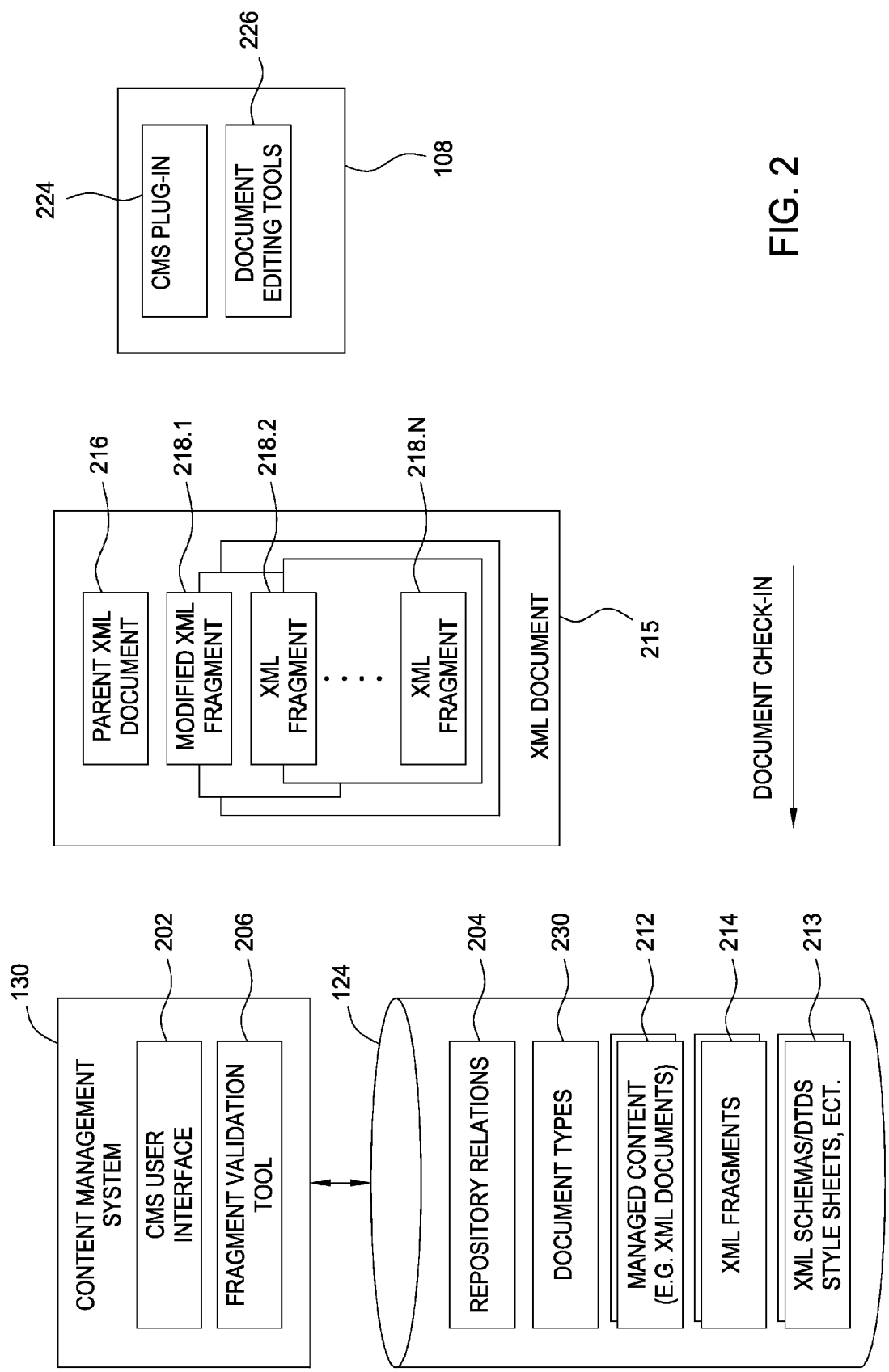
FIG. 2 is a conceptual illustration of a client application checking-in a document managed by a CMS, according to one embodiment of the invention.

FIG. 2 is a conceptual illustration of client application 108 checking-in a document managed by CMS 130, according to one embodiment of the invention. As shown, CMS 130 includes a CMS user interface 202 and a fragment validation tool 206. Those skilled in the art will recognize that the CMS 130 illustrated in FIG. 2 is simplified to highlight aspects of the present invention and that CMS systems typically include a variety of additional elements not shown in FIG. 2.

Generally, user interface 202 provides an interface to the functionality of CMS 130 and managed content 212 stored by database 140 and file system 142. Thus, user interface 202 may provide an interface for checking in/out a document from CMS 130, for creating, viewing, and exporting documents from CMS 130 etc. Additionally, user interface 202 may allow a user to define an XML fragment 214, to define content 212, to assemble an XML document 215, from multiple fragments 214 and enable a user to locate shared content (e.g. XML fragments 214) to include in a document being authored by the user.

Fragment validation tool 206 represents a component of CMS 130 configured to validate a modified XML fragment 218.1 to ensure it remains valid, in its modified form, within the context of any XML documents which include XML fragment 218.1. Alternatively, fragment validation tool 206 may be used during document authoring/editing to determine a list of available content to XML fragments 214 which are valid within the context of a particular document being authored by a user. Although shown as part of CMS 130, in an alternative embodiment, fragment validation tool 206 may run on a client system, such as client system 110 or 112.

In one embodiment, repository relations 204 specify the bindings between managed documents 212 and the grammars used to interpret the document, such as those defined in XML schemas/DTD's 213. For example, repository relations 204 may specify a particular DTD to use when accessing a specific type of XML document, as defined in document types 230.

As is known, an XML schema/DTD defines the allowed content and structure for a given type of XML document. More specifically, XML schemas/DTDs provide rules specifying which elements (e.g., the markup tags) and attributes (i.e., values associated with specific tags) are allowed for a particular type of XML document, as well as rules regarding other elements of document structure. For example, a parent XML document, as described above, may include references to a set of XML schemas/DTDS specifying the allowed structure and content for the parent and related child documents, such as an XML fragment 214. Each child document may itself be governed by its own grammar and schema. In addition to XML schema/DTDs 213, an XML fragment 214 may reference other files such as stylesheets, transforms (e.g., transforms used to generate an HTML or XHTML document from a source XML document) etc.

FIG. 2 also shows a burst XML document 215 being checked-in to the CMS 130. In one embodiment, when document 215 is checked-in, it is burst (by the CMS 130 or the client application 108) into a parent XML document 216, and one or more XML fragments 218.1-218.N, one (or more) of which may have been modified after XML document 216 was checked out from the CMS 130. For purposes of illustration, assume that modified XML fragment 218.1 represents such a fragment. In such a case, fragment validation tool 206 may be configured to determine a validation context for the modified fragment 218.1 and determine whether the modifications are valid for any other contexts associated with this fragment. Thus, if fragment 218.1 is included in many documents, the modifications are validated against each context in which fragment 218.1 is used.

As shown, client application 108 includes a CMS plug-in 224 and document editing tools 226. CMS plug-in 224 allows client application 108 to interact with CMS 130 and CMS user interface 202. For example, plug-in 224 may allow a user interacting with client application 108 to check-in and check-out documents (e.g., XML document 215) from CMS 130. Document editing tools 226 provide the substantive features associated with particular client application 108. For example, a word processing application may provide tools for specifying document presentation style and text-content or a web-browser may be used to render, view, and edit XML document 215. Another example of a client application 108 includes a web-browser application. Of course, depending on the function of client application 108, the features provided by viewing/editing tools 226 may be tailored to suit the needs of an individual case.

Validation Conflict

Figure 3A:
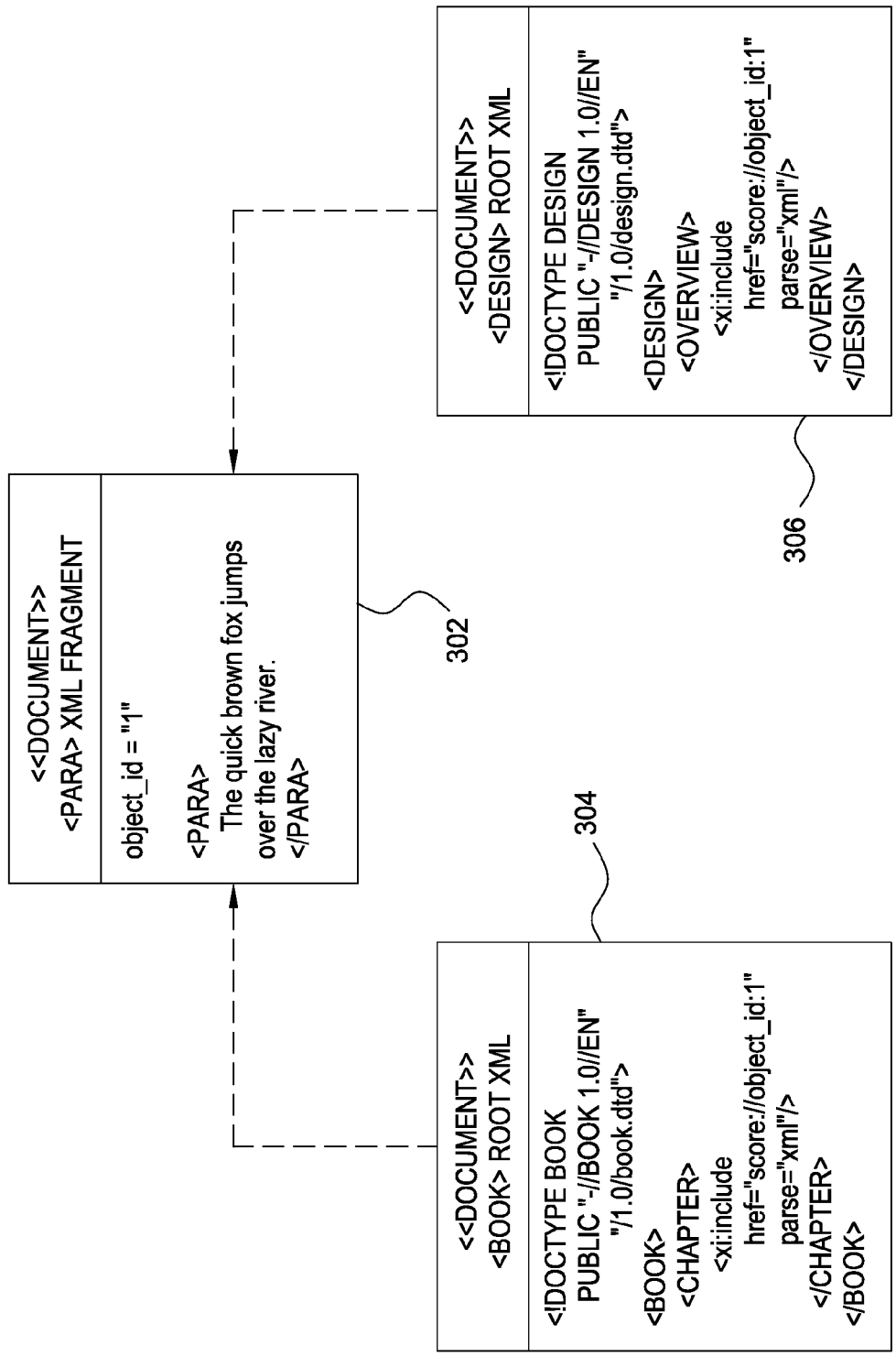
FIG. 3A illustrates two parent XML documents which utilize the same XML fragment despite being interpreted according to different XML grammars, according to one embodiment of the invention.

In one embodiment, an XML fragment may be shared between two or more XML documents, as described above. FIG. 3A illustrates such a situation, where XML parent documents 304 and 306 use the same XML fragment 302. Illustratively, XML fragment 302 contains a <PARA> element and an "object_id" of "1". In one embodiment, each fragment may contain an identifier used by documents referencing a given grammar. As shown, XML fragment 302 is incorporated into both the book document 304 and design document 306 as indicated by the reference to the object ID of "1" in the <CHAPTER> element (for book document 304, and the <OVERVIEW> element (for design document 306). Further, book document 304 is defined using a grammar specified in a book.dtd file and design document 306 is defined using a grammar specified in a design.dtd file. Assume for this example that the <PARA> element is defined in book.dtd as a text-only element and is restricted from including any sub-elements. Further assume that the <PARA> element is defined in design.dtd as an element which may include sub-elements. Thus, in its current form, fragment 302 is able to be validated in both the context of the book document 304 and the design document 306. However, if the author of the design document 306 modified fragment 302 so that it included a sub-element, as is illustrated by fragment 302' in FIG. 3B, fragment 302' would no longer be valid in the context of book document 304.

When design document 306 is checked-in to the CMS 130, fragment validation tool 206 may determine that fragment 302 has been modified to fragment 302'. The fragment validation tool 206 may also determine that in its current form, 302' is invalid in the context of the book document 304 and may proceed to resolve the conflict in a predefined manner.

Validation Conflict Solutions

Figure 4:
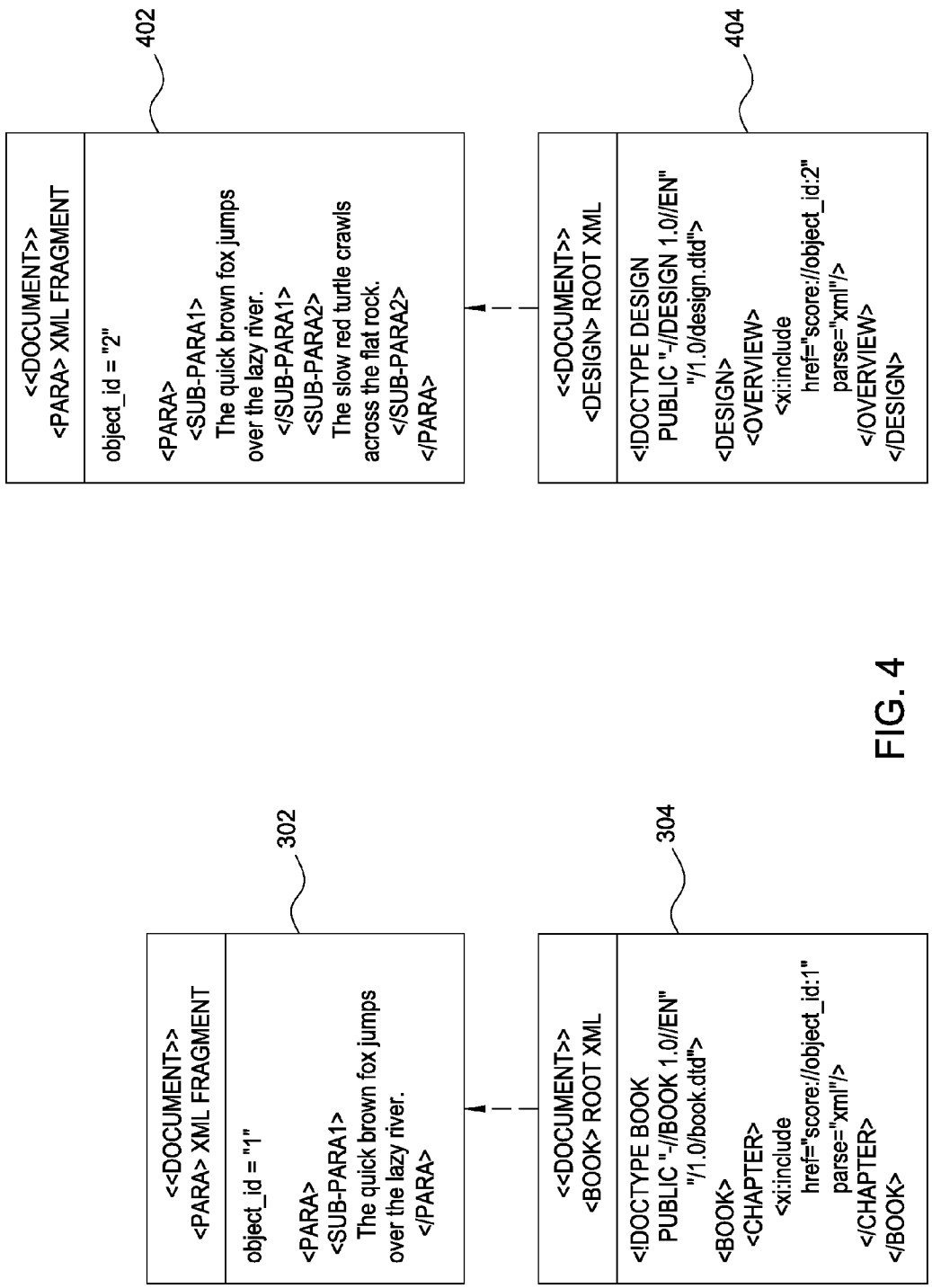
FIG. 4 illustrates one solution to the problem which occurs when a modified XML fragment is no longer valid within one of its pre-modification contexts, according to one embodiment of the invention.

FIG. 4 illustrates one solution to the modified XML fragment 302' no longer being valid for one of the contexts in which it is used (e.g. the context of book document 304), according to one embodiment of the invention. In this solution, when such a conflict is detected, fragment validation tool 206 may correct the problem by storing the modified XML fragment 302' as a separate document 402 within the CMS 130 from the pre-modified XML fragment 302. This separate document 402 may be viewed as a newer version of the existing fragment 302, or as a separate XML fragment altogether. Furthermore, the parent XML document in whose context XML fragment 302 was modified may be updated to be associated with the newly created XML fragment 402 and not fragment 302. For example, "object_id:1" in design document 306 from the preceding example has been updated to reference "object_id:2" in document 404. In this arrangement, other parent XML documents and XML fragments which referenced the XML fragment 302 may continue to reference the fragment 302. Alternatively, other parent XML documents and XML fragments which referenced the XML fragment 302 may be updated to be associated with the newly created XML fragment 402.

Similarly, in one embodiment, fragment validation tool 206 may correct a conflict by copying the XML fragment 302 as a separate document within the CMS 130 and replacing the original XML fragment 302 with the modified XML fragment 302'. In such a case, any parent XML document which did validate with the modified XML fragment 302' (such as book document 304 in the preceding example) may be updated to reference the newly created XML fragment containing the data copied from XML fragment 302. In this arrangement, other parent XML documents and XML fragments which incorporated content of the pre-modification XML fragment 302 may now reference the content of modified XML fragment 302' without being updated or modified. Alternatively, other parent XML documents and XML fragments which incorporate the content of XML fragment 302 may be updated to be associated with the newly created XML fragment which contains the original, pre-modification data for XML fragment 302.

One skilled in the art will recognize that, with respect to updating other parent XML documents and XML fragments, the previous embodiments are merely examples of how CMS 130 and/or fragment validation tool 206 may process validation conflicts when checking-in a multi-context fragment and are not meant to be limiting. For example, in an alternate embodiment, some (but not all) parent XML documents and XML fragments which referenced XML fragment 302 may be updated to reference the newly created XML fragment based on criteria such as date of creation of the document/fragment, preferences contained within the document/fragment, document type, etc.

Figure 5:
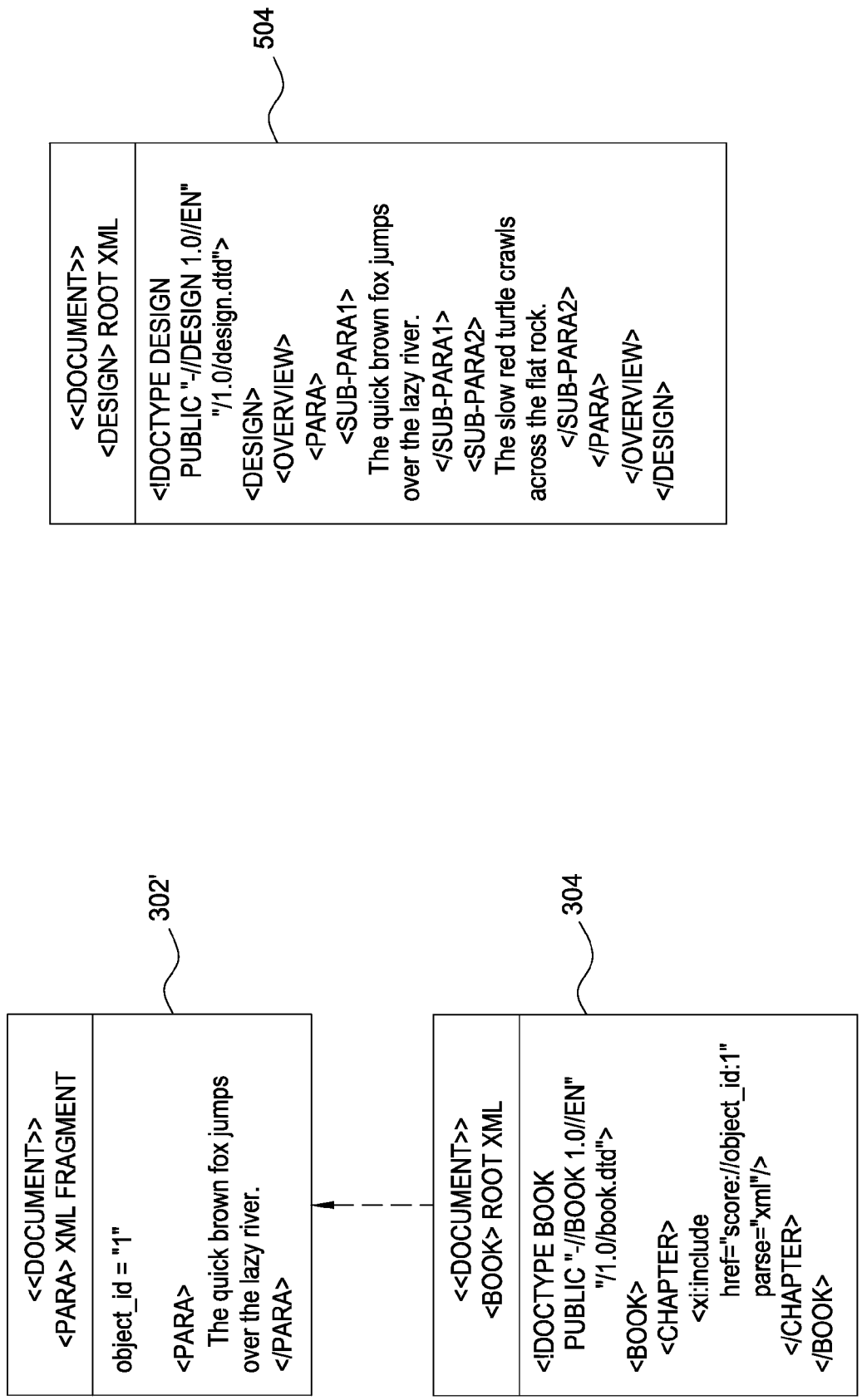
FIG. 5 illustrates another solution to the problem which occurs when a modified XML fragment is no longer valid within one of its pre-modification contexts, according to one embodiment of the invention.

FIG. 5 illustrates another solution to the problem which occurs when a modified XML fragment is no longer valid within one of its pre-modification contexts, according to one embodiment of the invention. In this scenario, the data 402 from modified XML fragment 302' may be incorporated within the modifying parent XML document 304. Thus, XML fragment 302 may remain unchanged, as well as other parent XML documents and XML fragments which reference XML fragment 302. In other words, the contents of modified XML fragment 302' may be copied into the parent document, ultimately leaving the fragment 302 in its original form. This result is illustrated by document 504 which includes content from fragment 302' when this fragment was checked into CMS 130.

Figure 6:
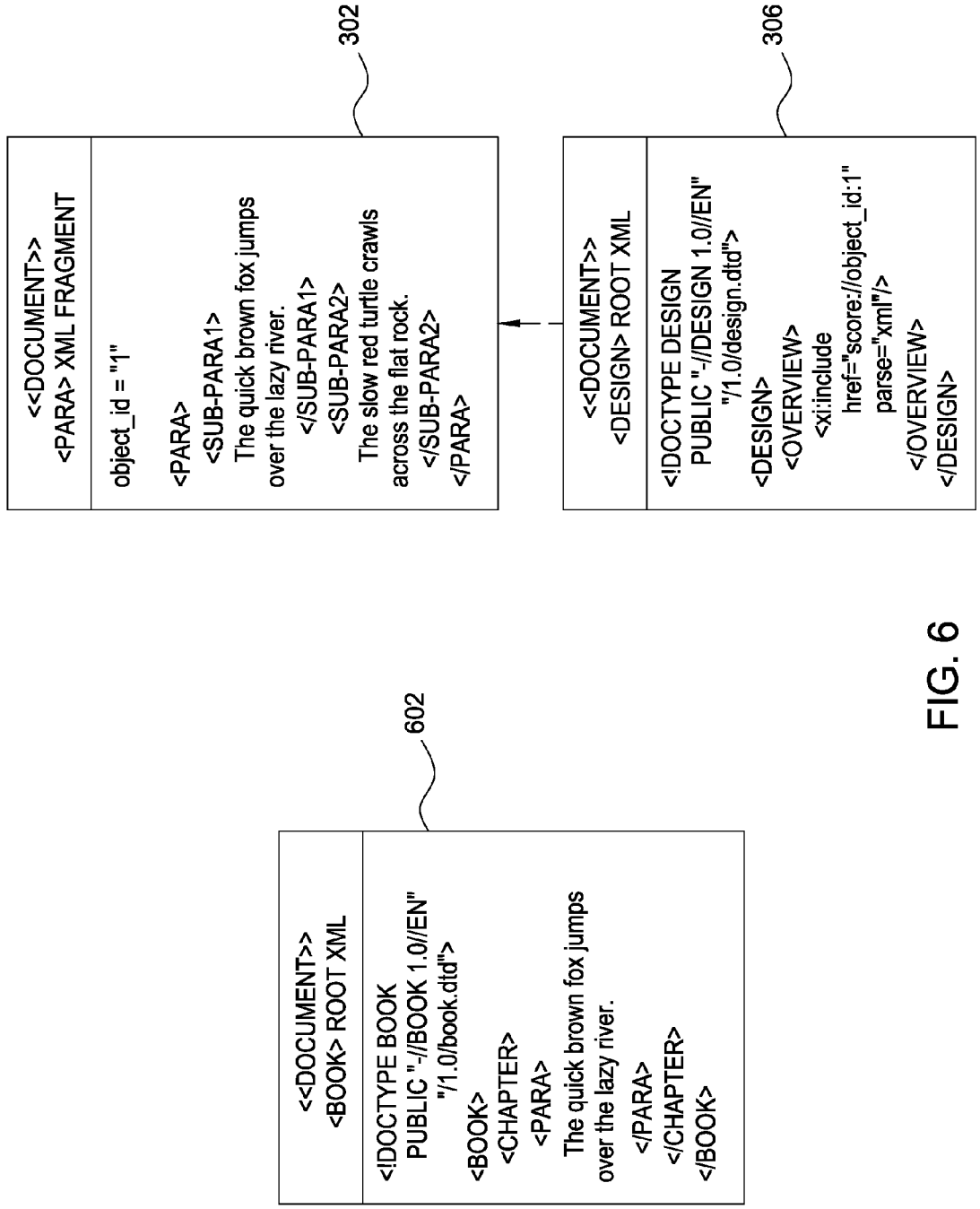
FIG. 6 illustrates yet another solution to the problem which occurs when a modified XML fragment is no longer valid within one of its pre-modification contexts, according to one embodiment of the invention.

FIG. 6 illustrates another solution to the problem which occurs when a modified XML fragment is no longer valid within one of its pre-modification contexts, according to one embodiment of the invention. In this case, when a parent XML document or an XML fragment which references the XML fragment 302 fails to validate with modified XML fragment 302', the data from XML fragment 302 may be incorporated into the document/fragment which failed to validate with the modified fragment. Further, the XML fragment 302 in the CMS 130 may be updated to include the content of modified XML fragment 302'. In other words, the original content is moved into the document which failed to validate with the updated content, and the reference to the modified fragment is removed from the document. This is illustrated n FIG. 6 where document 602 now includes the original content of fragment 302, and document 306 references the modified fragment 302'. Accordingly, documents which fail to validate may be modified to include the pre-modification XML fragment data and documents which pass validation may reference to the modified XML fragment 302'.

In addition to the solutions to validation conflicts discussed above, there are other solutions which one in the art will recognize as equally viable. In one embodiment, these solutions include updating the schema of any parent XML document which does not pass validation so that the document will pass validation in the future. Another solution involves allowing the fragment modification as-is and notifying the owner of the parent XML document and/or the XML fragment to the conflict. Yet another solution to the validation conflict described above would use rules to transform the "broken"

XML fragment into content which would be valid in the context of the parent XML document.

In one embodiment, a solution to a validation conflict may be chosen according to a default configuration within the CMS 130. The default may be specified according to a document type or may be applicable for any document type managed by CMS 130. Alternatively, a specific validation conflict solution may be specified for a given grammar, document, or XML fragment. Furthermore, in another embodiment, CMS 130 may be configured to prompt a user to specify an appropriate validation conflict solution when processing a document being checked into CMS 130.

Validation of a Modified Fragment

Figure 7:
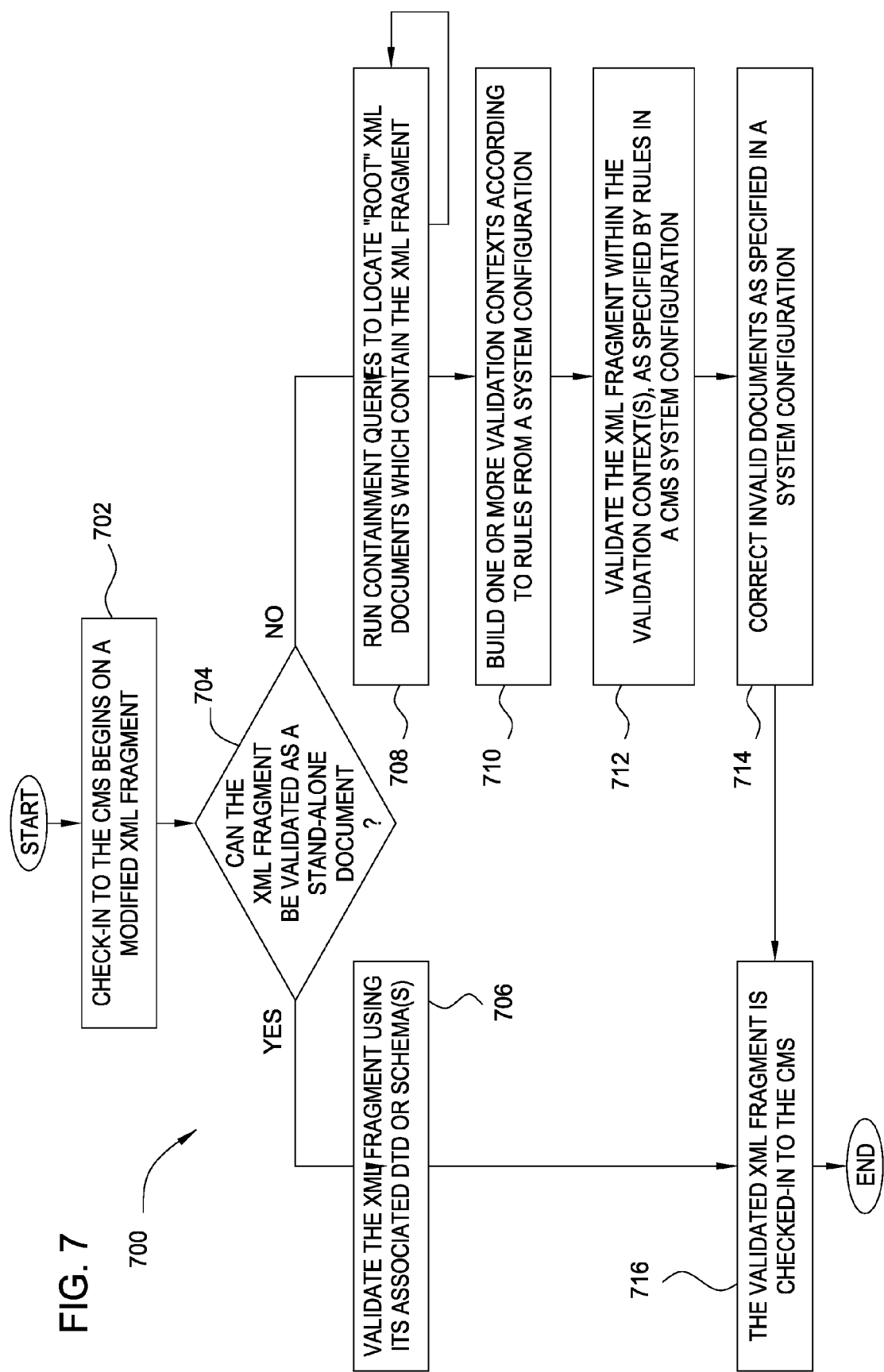
FIG. 7 is a flow diagram illustrating a method 700 for validating a modified XML fragment, according to one embodiment of the invention.

FIG. 7 is a flow diagram illustrating a method 700 for validating a modified XML fragment, according to one embodiment of the invention. More specifically, method 700 illustrates a method for processing a multi-context XML fragment. As shown, method 700 begins at step 702, where a user of CMS 130 initiates the check-in procedure for a checked-out document that includes a modified XML fragment. At step 704, a determination is made whether the modified XML fragment may be validated as a stand-alone document. For example, in some cases, the XML fragment may be associated with an XML configuration set, a document-type declaration, a schema declaration, or any similar indication of a top-level binding, apart from any parent document which references the fragment. That is, in some cases the XML fragments referenced by a parent document may be validated against their own schema, regardless of what documents reference that XML fragment, or what schemas are associated with the parent document.

If the modified XML fragment can be verified as a stand-alone document, then at step 706, CMS 130 may validate the document using its associated DTD or schema(s). Method 700 then proceeds to step 716, where the validated XML fragment may be checked in to CMS 130 and stored in the CMS document repository (e.g. repsoitory 124 and XML fragments 214).

Figure 3B:
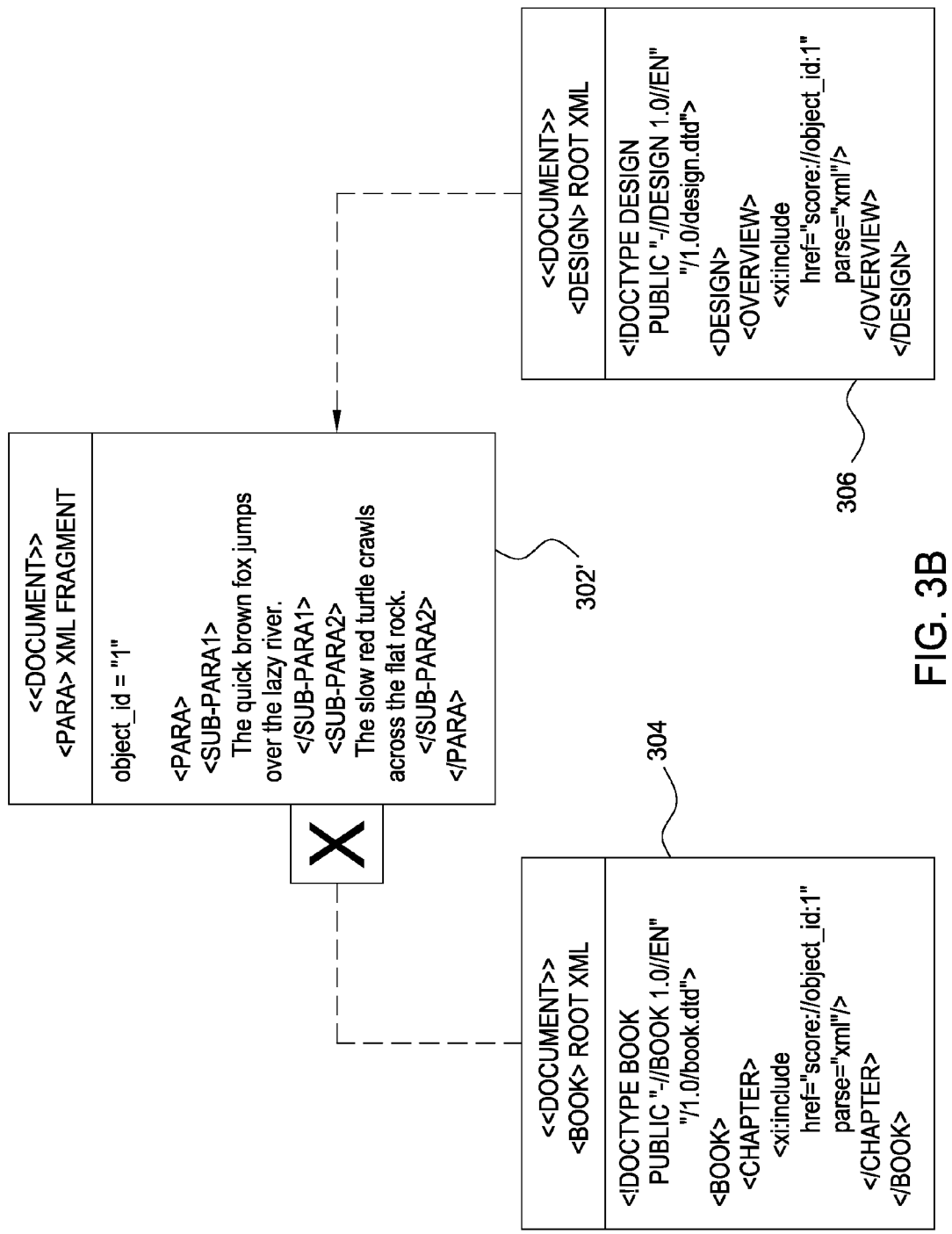
FIG. 3B illustrates a conflict which may arise when two parent XML documents utilize the same XML fragment, according to one embodiment of the invention.

Otherwise, if the modified XML fragment cannot be verified as a stand-alone document, method 700 proceeds to step 708. At step 708, fragment validation tool 206 uses containment reports or similar queries to locate "root" XML documents which contain the XML fragment. Since an XML fragment may be contained within other XML fragments, the fragment validation tool 206 may continue to search for an ancestor fragments until the fragment validation tool 206 locates an ancestor which has an associated XML configuration set, a document-type declaration, a schema declaration, or other similar indication of a top-level document type binding. Such a document is referred to as a root XML document. In other words, at step 708, fragment validation tool 206 may determine which documents managed by CMS 130 include the particular fragment being checked-in. As shown in FIGS. 3A and 3B, for example, fragment validation tool 206 would determine that fragment 302 is referenced by both document 304 (a document of doctype <BOOK>) as well as document 306 (a document of doctype <DESIGN>). Thus, the fragment validation tool would need to validate the modified content of the <PARA> element in the context of the schema for the <BOOK> document type as well as the <DESIGN> document type.

At step 710, the fragment validation tool 206 builds one or more validation contexts in accordance with rules specified in a system configuration within the CMS 130. That is, to validate the modified XML fragment, fragment validation tool 206 needs to create a document that includes the modified XML fragment. These documents are then used to validate the modified fragment against each of the contexts. Such rules may include using all data from the root XML document(s) containing the modified fragment (and other) fragments to produce a complete validation context using the actual documents managed by CMS 130. However, if the XML fragment is used in numerous root XML documents, this procedure for building a validation context may be resource intensive for the CMS 130. Therefore, by constructing "skeletons" of the root XML document(s) based on their DTD or schemas, a simpler, minimum validation context may be built. In a particular embodiment, the W3C standard XML Fragment Interchange (http://www.w3.org/TR/xml-fragment) could be used to accomplish such a result.

Furthermore, in one embodiment, the fragment validation tool 206 may not build a validation context for each root XML document. Rather, the fragment validation tool 206 may build a validation context for a specific document(s) (e.g. the first matching root document or all documents of a specific document type), or may prompt the user to select which root documents in whose context the XML fragment is to be validated. One skilled in the art will recognize that there are numerous other ways to select which validation contexts to build that are equally effective. Alternatively, the fragment validation tool 206 may build validation contexts for all root XML documents, and the specific contexts to use for validation may be selected in accordance with rules specified within the CMS 130.

At step 712, fragment validation tool 206 may validate the modified XML fragment according to the validation context (or contexts) built in step 710. Alternatively, as described above, the fragment validation tool 206 may validate the modified XML fragment according to one or more selected validation contexts as specified by a system configuration within the CMS 130.

At step 714, a root document whose contexts do not pass validation may be corrected according to a validation conflict solution specified in a system configuration. Such validation conflict solutions are discussed above in conjunction with FIGS. 4, 5, and 6 and include storing the modified XML fragment as a new version of the XML fragment, incorporating the data of the original fragment within the body of the root XML document which did not pass validation, and prompting a user to specify the appropriate response.

Once a fragment has passed validation or all validation conflicts have been resolved, method 700 continues to step 716 where, as described above, the validated XML fragment may be checked in to CMS 130.

Validation of Shared Content

Figure 8:
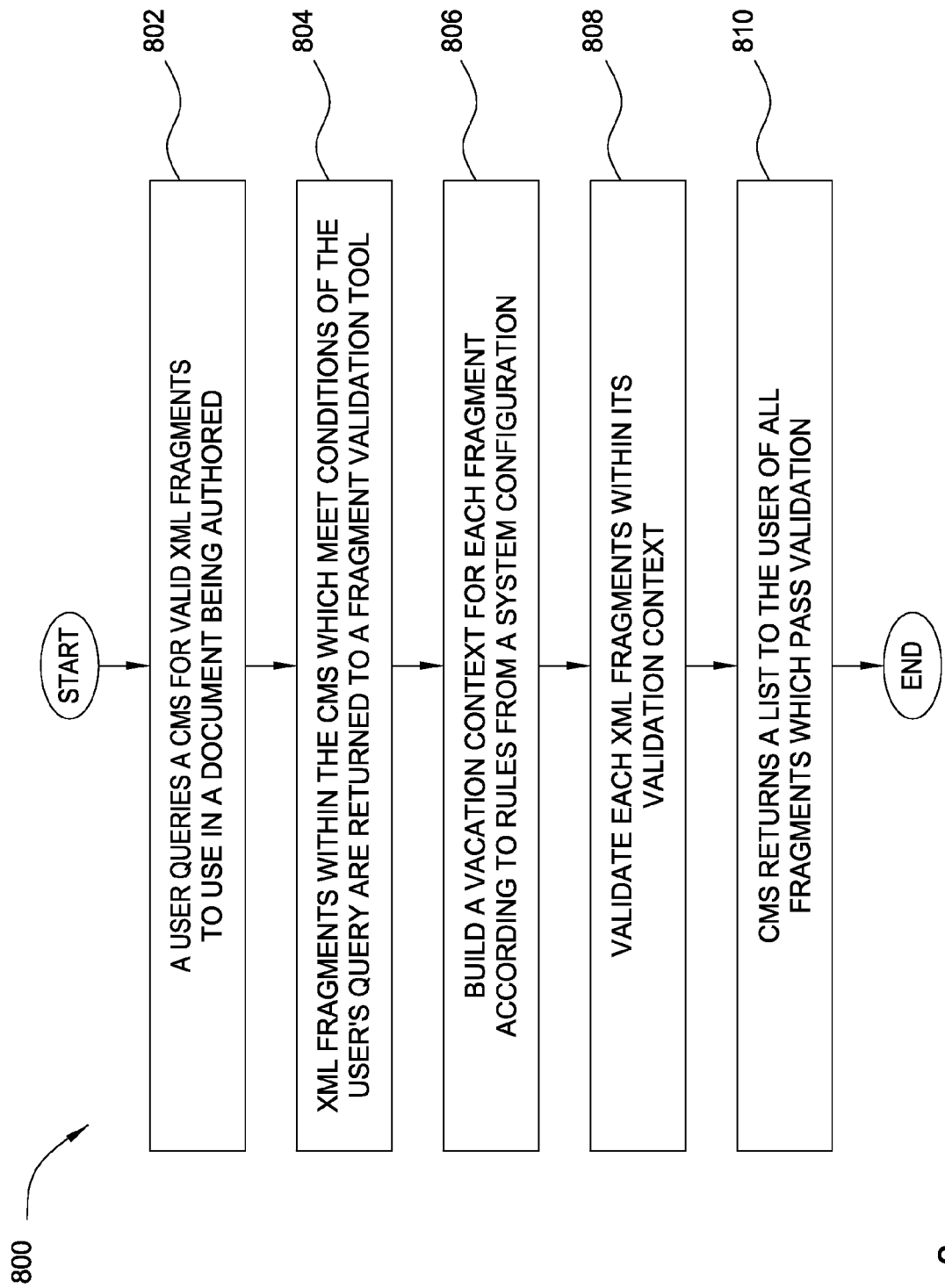
FIG. 8 is a flow diagram depicting a process for validating an XML fragment when searching for shared XML content to use within an XML document, according to one embodiment of the invention.

While the above has primarily been directed towards a tool for validation of modified XML fragments within a CMS 130, fragment validation tool 206 may have various other uses. For example, fragment validation tool 206 may be used by the CMS 130 when a user is authoring a document. FIG. 8 is a flow diagram illustrating a method 800 for validating an XML fragment when searching for shared XML content to use within an XML document, according to one embodiment of the invention. Method 800 begins at step 802, where an author of a document queries the CMS 130 for existing fragments to use in a document being edited. The query may search for a particular element, a document type, all fragments modified after a certain date, etc. Alternatively, the query may simply be to return all XML fragments which may be included in the document.

At step 804, the CMS 130 determines which XML fragments meet conditions of the user's query and sends the results to a fragment validation tool 206. At step 806, the fragment validation tool 206 may build a validation context for each XML fragment identified by the user's query. As described above, fragments may be stand-alone documents, or may exist within the context of a root XML document. When a fragment is a stand-alone document, its validation context is that defined by its associated XML configuration set, document-type declaration, schema declaration, or any similar element which indicates a top-level binding. However, since validation is done to determine whether the XML fragment is valid in the context of the document the user is authoring, the context of a fragment which is not a stand-alone document may be the context of the user's document.

As described, the document may be a compound document assembled from a collection of XML fragments. Thus, in one embodiment, the user may desire to edit the document by adding additional fragments available from the repository 124 (or elsewhere). For example, using the document types illustrated in FIGS. 3-6, the user may desire to search the repository 124 to identify <PARA> fragments that may be included in a given document. If the user is editing a document of the type <BOOK> then only <PARA> elements that do not include sub-elements are retrieved. In contrast, if the user is editing a document of the type <DESIGN>, then <PARA> elements that include sub-elemetns would also be retrieved. Of course, the <BOOK>, <DESIGN>, and <PARA> elements are provided as examples, and the actual tags, and rules would depend on the particulars of a given case. Accordingly, at step 808, each XML fragment identified by the user's query is validated according to its validation context built in step 806. In an alternate embodiment, rather than batch processing all XML fragments at once, method 800 could proceed by looping through steps 806 and 808. In such a case, the validation tool 206 builds a validation context for a single XML fragment, validate the fragment, and repeat until all fragments identified by the query have been validated.

At step 810, method 800 terminates where the CMS 130 returns a list of all XML fragments returned by the user's query which passed validation. By selecting reusable content from such a validated list, the potential for conflict between the authored document and the XML fragment is reduced.

One skilled in the art will recognize that process 800 is an exemplary process for validating XML fragments for use within a document, and that other processes may achieve the same end result in a different manner. Such other processes are also herein contemplated.

While the foregoing is directed to embodiments of the present invention, other and further embodiments of the invention may be devised without departing from the basic scope thereof, and the scope thereof is determined by the claims that follow.

What is claimed is:

1. A method of managing data objects in a content management system (CMS), comprising:
   accessing a first data object managed by the CMS, wherein the first data object includes a collection of one or more data object fragments, wherein a first fragment of the one or more data object fragments is referenced by a second data object stored in the CMS, and wherein the first data object and the second data object are composed according to respective schemas;
   receiving a modified version of the first data object to store in the CMS wherein the modified version of the first data object includes a modified version of the first fragment;
   fragmenting the modified version first data object into the one or more data object fragments;
   validating the modified version of the first fragment against the schema associated with the second data object; and
   upon determining that the modified version of the first fragment fails to validate against the schema associated with the second data object, performing a corrective action specified by the CMS, wherein the corrective action comprises generating an unmodified version of the first fragment, and further comprises one of:
   (i) incorporating the content from the modified version of the first fragment into the first data object,
   associating the unmodified version of the first fragment with the second data object, and
   discarding the modified version of the first fragment; and
   (ii) incorporating the content from the unmodified version of the first fragment into the second data object,
   associating the modified version of the first fragment with the first data object, and
   discarding the unmodified version of the first fragment.

2. The method of claim 1, wherein the schema for the first data object defines the allowable content or structure of the first data object and the schema for the second data object defines the allowable content or structure of the second data object.

3. The method of claim 2, wherein the first and second data objects are XML documents and wherein the schema for the first and second data objects are XML schemas.

4. The method of claim 1, wherein the first and second data objects are XML documents, and wherein each fragment includes one or more XML elements stored as an independent XML document by the CMS.

5. A computer-readable storage medium containing a program which, when executed, performs an operation for managing data objects in a content management system (CMS), the operation comprising:
   accessing a first data object managed by the CMS, wherein the first data object includes a collection of one or more data object fragments, wherein a first fragment of the one or more data object fragments is referenced by a second data object stored in the CMS, and wherein the first data object and the second data object are composed according to respective schemas;
   receiving a modified version of the first data object to store in the CMS wherein the modified version of the first data object includes a modified version of the first fragment;
   fragmenting the modified version first data object into the one or more data object fragments;
   validating the modified version of the first fragment against the schema associated with the second data object; and
   upon determining that the modified version of the first fragment fails to validate against the schema associated with the second data object, performing a corrective action specified by the CMS, wherein the corrective action comprises generating an unmodified version of the first fragment, and further comprises one of:
   (i) incorporating the content from the modified version of the first fragment into the first data object,
   associating the unmodified version of the first fragment with the second data object, and
   discarding the modified version of the first fragment; and
   (ii) incorporating the content from the unmodified version of the first fragment into the second data object,
   associating the modified version of the first fragment with the first data object, and
   discarding the unmodified version of the first fragment.

6. The computer-readable medium of claim 5, wherein the schema for the first data object defines the allowable content or structure of the first data object and the schema for the second data object defines the allowable content or structure of the second data object.

7. The computer-readable medium of claim 6, wherein the first and second data objects are XML documents and wherein the schema for the first and second data objects are XML schemas.

8. The computer-readable medium of claim 5, wherein the first and second data objects are XML documents, and wherein each fragment includes one or more XML elements stored as an independent XML document by the CMS.

9. A system, comprising:
   a processor; and
      a memory containing a content management system (CMS) program which, when executed by the processor, performs an operation for managing data objects in the CMS, the operation comprising:
      accessing a first data object managed by the CMS, wherein the first data object includes a collection of one or more data object fragments, wherein a first fragment of the one or more data object fragments is referenced by a second data object stored in the CMS, and wherein the first data object and the second data object are composed according to respective schemas,
      receiving a modified version of the first data object to store in the CMS wherein the modified version of the first data object includes a modified version of the first fragment,
      fragmenting the modified version first data object into the one or more data object fragments,
      validating the modified version of the first fragment against the schema associated with the second data object, and
      upon determining that the modified version of the first fragment fails to validate against the schema associated with the second data object, performing a corrective action specified by the CMS, wherein the corrective action comprises generating an unmodified version of the first fragment, and further comprises one of:
         (i) incorporating the content from the modified version of the first fragment into the first data object,
         associating the unmodified version of the first fragment with the second data object, and
         discarding the modified version of the first fragment; and
         (ii) incorporating the content from the unmodified version of the first fragment into the second data object,
         associating the modified version of the first fragment with the first data object, and
         discarding the unmodified version of the first fragment.

10. The system of claim 9, wherein the schema for the first data object defines the allowable content or structure of the first data object and the schema for the second data object defines the allowable content or structure of the second data object.

11. The system of claim 10, wherein the first and second data objects are XML documents and wherein the schema for the first and second data objects are XML schemas.

12. The system of claim 9, wherein the first and second data objects are XML documents, and wherein each fragment includes one or more XML elements stored as an independent XML document by the CMS.

* * * * *